United States Patent
Takayanagi et al.

(10) Patent No.: US 10,241,560 B2
(45) Date of Patent: *Mar. 26, 2019

(54) CONTROL SCHEME TO TEMPORARILY RAISE SUPPLE VOLTAGE IN RESPONSE TO SUDDEN CHANGE IN CURRENT DEMAND

(71) Applicant: Apple Inc., Cupertino, CA (US)

(72) Inventors: Toshinari Takayanagi, San Jose, CA (US); Jung Wook Cho, Cupertino, CA (US); Patrick D. McNamara, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/212,880

(22) Filed: Jul. 18, 2016

(65) Prior Publication Data

US 2017/0010646 A1    Jan. 12, 2017

Related U.S. Application Data

(63) Continuation of application No. 13/925,950, filed on Jun. 25, 2013, now Pat. No. 9,395,775.

(51) Int. Cl.
  *G06F 1/26* (2006.01)
  *G06F 1/32* (2006.01)
  *G06F 1/324* (2019.01)
  *G06F 1/3296* (2019.01)

(52) U.S. Cl.
  CPC ............... *G06F 1/324* (2013.01); *G06F 1/26* (2013.01); *G06F 1/266* (2013.01); *G06F 1/3296* (2013.01); *Y02D 10/126* (2018.01); *Y02D 10/172* (2018.01)

(58) Field of Classification Search
  CPC .......................................................... G06F 1/26
  USPC .......................................................... 713/300
  See application file for complete search history.

(56) References Cited

U.S. PATENT DOCUMENTS

| | | |
|---|---|---|
| 5,926,394 A | 7/1999 | Nguyen et al. |
| 6,229,292 B1 | 5/2001 | Redl et al. |
| 7,421,604 B1 | 9/2008 | Mimberg |
| 7,437,586 B2 | 10/2008 | Cornelius |
| 7,616,456 B2 | 11/2009 | Ostrom et al. |
| 8,816,757 B1 | 8/2014 | Yabbo et al. |
| 2002/0138778 A1 | 9/2002 | Cole et al. |
| 2012/0151225 A1 | 6/2012 | Huang et al. |
| 2012/0290852 A1 | 11/2012 | Rahardjo et al. |
| 2014/0117951 A1 | 5/2014 | Daily |

*Primary Examiner* — Vincent H Tran
*Assistant Examiner* — Chad G Erdman
(74) *Attorney, Agent, or Firm* — Meyertons, Hood, Kivlin, Kowert & Goetzel, P.C.

(57) ABSTRACT

A system for managing changes in current demand, including one or more processors, a memory coupled to at least one of the processors, a clock generation circuit coupled to the memory and configured to output a clock, one or more functional blocks, a power supply, configured to output a plurality of voltage levels, and a power management unit. The power management unit may be configured to set the power supply output to a first voltage level and then detect indications of an impending change in current demand within the SoC. If an indication of an impending change in current demand is detected, then the power management unit may be configured to adjust the power supply output to a second voltage level. After determining the impending change in current demand has occurred, the power management unit may be configured to adjust the power supply output back to the first voltage level.

13 Claims, 4 Drawing Sheets

CONTROL SCHEME TO TEMPORARILY RAISE SUPPLE VOLTAGE IN RESPONSE TO SUDDEN CHANGE IN CURRENT DEMAND

PRIORITY INFORMATION

The present application is a continuation of U.S. application Ser. No. 13/925,950 titled "CONTROL SCHEME TO TEMPORARILY RAISE SUPPLY VOLTAGE IN RESPONSE TO SUDDEN CHANGE IN CURRENT DEMAND" and filed on Jun. 25, 2013, which is hereby incorporated by reference in its entirety as though fully and completely set forth herein.

BACKGROUND

Technical Field

This invention is related to the field of integrated circuit implementation, and more particularly to the implementation of power management circuits.

Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

In some SoC designs, processors included in the SoC may enter an inactive state upon completing certain computing tasks to reduce power consumption or to reduce the emission of electromagnetic interference (EMI). Peripheral circuitry may similarly enter idle states to further conserve system power consumption or reduce EMI. Another method for reducing power is to reduce the operating frequency of the system when there is a low demand for processing power. A lower operating frequency reduces the dynamic current of the system. In addition, functional blocks not in use may be powered down or placed into low power idle states.

In some system-on-a-chip (SoC) designs, a voltage regulator may be used to maintain the voltage level of the power supply used throughout the SoC to prevent the voltage level from rising to a level which may damage the circuits. Some voltage regulating systems may be capable of providing multiple voltage levels such that the system voltage level may be adjusted to match the power requirements in certain states. For example, the voltage level of the power supply may be reduced when the processor is in an idle state.

The method on which many voltage regulator designs operate may be susceptible to problems when there is a sudden change in the current consumption from the logic circuits to which the regulator is providing power. A sudden increase in current consumption may cause a temporary drop in the voltage level of the output of the regulator while the regulator adjusts to compensate. If the voltage level drops below a minimum voltage level necessary to operate the logic circuits, even briefly, a logic state within the logic circuits may be corrupted, which may lead to indeterminate behavior and a possible processing exception.

A known SoC device includes a circuit that increases a system voltage to a safe voltage level, higher than the normal operating voltage level, in response to a temperature measurement that indicates the temperature of the SoC is rising above a nominal level. In addition to increasing the system voltage responsive to a temperature measurement, this circuit will increase the system voltage responsive to an increase to the frequency of the processor's clock. The increase of the system voltage to the safe voltage level lasts approximately 10 microseconds and then returns to the normal operating voltage level.

SUMMARY OF THE EMBODIMENTS

Various embodiments of a power management system are disclosed. Broadly speaking, a system, an apparatus, and a method are contemplated in which the system includes one or more processors, a memory coupled to at least one of the processors, a clock generation circuit coupled to the memory and configured to output a clock signal, one or more functional blocks, a power supply, configured to output a plurality of voltage levels, and a power management unit. The power management unit may be configured to set the power supply output to a first voltage level and then detect indications of an impending change in current demand within the SoC. If an indication of an impending change in current demand is detected, then the power management unit may be configured to adjust the power supply output to a second voltage level. After determining the impending change in current demand has occurred, the power management unit may be configured to adjust the power supply output back to the first voltage level.

In an various embodiments, to detect indications of an impending change in current demand within the SoC, the power management unit may be further configured to monitor instructions queued for the one or more processors, monitor accesses to the memory, monitor the clock management circuit, or monitor a power status of the one or more functional blocks.

In other embodiments, the power management unit may be further configured to wait a predetermined amount of time after determining the impending change in current demand has occurred. In alternate embodiments, the predetermined amount of time may vary depending on the source of the cause of the impending change in current demand.

BRIEF DESCRIPTION OF THE DRAWINGS

The following detailed description makes reference to the accompanying drawings, which are now briefly described.

Figure 1:
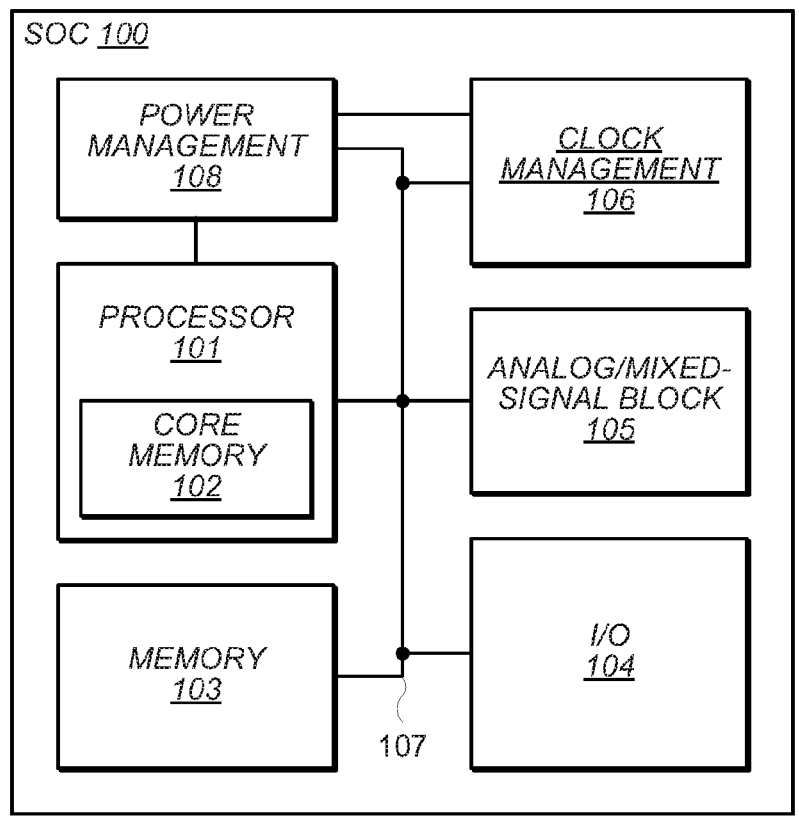
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. To reduce power consumption in some SoC designs, processors included in the SoC may enter an inactive, idle state upon completing certain computing tasks. An idle state may be when the processor is not executing instructions. An idle state may additionally include a lack of activity in one or more co-processors such as, for example, an arithmetic logic unit. Other methods for reducing power include turning various functional blocks off or putting them in low power modes when they are not in use. In some SoC designs, one or more clock frequencies may be temporarily reduced when the functional blocks coupled to the clock do not currently require a full speed clock.

When a functional block, such as, for example, a second CPU core, or floating point coprocessor, or an encryption engine, transitions from an off state or a low power state to a fully active state, the transition may cause a sudden change in current demand on the power source. The sudden current increase may be induced to charge the functional block from an off or low power state to an operational or high activity state (so called wake-up in-rush current). Such a sudden increase in current consumption may cause a temporary drop in the voltage level of the output of a voltage regulator as the regulator adjusts to compensate. If the voltage level drops below a minimum voltage level necessary to operate the circuits, even briefly, a state within the circuits may be corrupted, which may lead to indeterminate behavior and a possible failure.

Various embodiments of a power management unit and method to identify sudden changes in current consumption and prepare an SoC power supply for these sudden changes are discussed in this disclosure. The embodiments illustrated in the drawings and described below may provide techniques for managing a power supply circuit within a computing system that may prevent erroneous operation of circuits included in an SoC.

System-On-a-Chip Overview

A block diagram of an embodiment of an SoC is illustrated in FIG. 1. In the illustrated embodiment, the SoC 100 includes a processor 101 including a core memory 102 and coupled to memory block 103, I/O block 104, analog/mixed-signal block 105, clock management unit 106, and power management unit 108, all coupled through bus 107. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores. In some embodiments, processor 101 may include one or more register files and memories.

In some embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory block, for example.

Core memory 102 may be configured to store frequently used instructions and data for the processor 101. Core memory 102 may be comprised of SRAM, DRAM, or any other suitable type of memory. In some embodiments, core memory 102 may be a part of a processor core complex (i.e., part of a cluster of processors) as part of processor 101 or it may be a separate functional block from processor 101. In other embodiments, core memory may be a cache memory.

Memory 103 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magnetoresistive Random Access Memory (MRAM), for example. Some embodiments may include a single memory, such as memory 103 and other embodiments may include more than two memory blocks (not shown). In some embodiments, memory 103 may be configured to store program instructions that may be executed by processor 101. Memory 103 may, in other embodiments, be configured to store data to be processed, such as graphics data, for example.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 104 may be configured to perform the data processing necessary to implement an Ethernet (IEEE 802.3) networking standard.

Analog/mixed-signal block 105 may include a variety of circuits including, for example, a crystal oscillator, a phase-locked loop (PLL) or delay-locked loop (DLL), an analogto-digital converter (ADC), and a digital-to-analog converter (DAC) (all not shown). In some embodiments, analog/mixed-signal block 105 may also include, in some embodiments, radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to select one or more clock sources for the functional blocks in SoC 100. In various embodiments, the clock sources may be located in analog/mixed-signal block 105, in clock management unit 106, in other blocks with SoC 100, or come from external to SoC 100, coupled through an I/O pin. In some embodiments, clock management 106 may be capable of dividing a selected clock source before it is distributed throughout SoC 100.

System bus 107 may be configured as one or more buses to couple processor 101 to the other functional blocks within the SoC 100 such as, e.g., memory 102, and I/O block 104. In some embodiments, system bus 107 may include interfaces coupled to one or more of the functional blocks that allow a particular functional block to communicate through the bus. In some embodiments, system bus 107 may allow movement of data and transactions (i.e., requests and responses) between functional blocks without intervention from processor 101. For example, data received through the I/O block 104 may be stored directly to memory 103.

Power management unit 108 may be configured to manage power delivery to some or all of the functional blocks included in SoC 100. Power management unit 108 may comprise sub-blocks for managing multiple power supplies for various functional blocks. In various embodiments, the power supplies may be located in analog/mixed-signal block 105, in power management unit 108, in other blocks with SoC 100, or come from external to SoC 100, coupled through a power supply pin. Power management unit 108 may receive signals that indicate the operational state of one or more functional blocks. In response to the operational state of a functional block, power management unit may adjust the output of a power supply.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltage levels.

Power Management within an SoC

Figure 2:
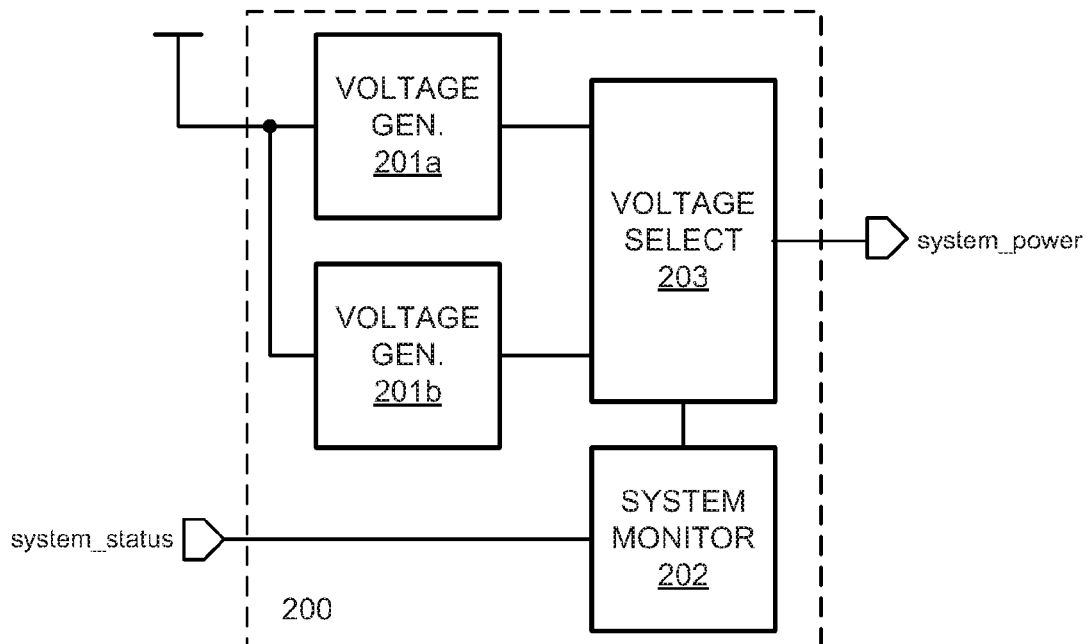
FIG. 2 illustrates an embodiment of a power management unit.

Turning to FIG. 2, an embodiment of a power management unit is illustrated. Power management unit 200, in some embodiments, may correspond to power management unit 108 in FIG. 1. Power management unit 200 may include two power supplies, voltage generator 201a and voltage generator 201b, system monitor 202, and voltage selector 203. Various embodiments of power management unit may have more than two supply voltages, or supply voltages may reside outside of the power management unit and simply receive the voltage signals for distribution to functional blocks within SoC 100.

Voltage generator 201a and voltage generator 201b may be coupled to a system power supply and may generate output signals of different voltage levels to provide power to one of more functional blocks within a system such as, e.g., SoC 100 as illustrated in FIG. 1. In some embodiments, voltage generator 201a may generate an output signal with a voltage level to be used during normal operation of SoC 100 and voltage generator 201b may generate an output signal with a voltage level to be used when SoC 100 is expecting a sudden increased workload that may require a temporary increase in voltage. In some embodiments, a single supply voltage that may be capable of generating a plurality of output signals of various voltage levels may be used. Voltage generator 201a and voltage generator 201b may be designed according to one of various design styles and may include voltage regulators, voltage dividers, charge pumps, voltage doublers, or any other suitable voltage generation circuit.

System monitor 202 may be coupled to one or more functional blocks within SoC 100. In some embodiments, system monitor may detect indications of an upcoming change in the SoC workload that may result in a sudden change in the current demand. An example of an indication that system monitor 202 may detect includes clock management 106 receiving a command to change frequency. Other examples include commands to enable or disable a given functional block, a read command to certain memory types, a write command to a non-volatile memory, or a specific instruction or set of instructions in a command execution queue. In response to detecting indications that a sudden change in current demand may be impending, system monitor 202 may assert a signal.

Voltage selector 203 may, in some embodiments, be coupled to supply voltages 201a and 201b and to system monitor 202. In some embodiments, voltage selector 203 may select a voltage level to distribute to functional blocks in SoC 100, determined by one or more signals received from system monitor 202. For example, if system monitor 202 is not asserting a signal to indicate an impending change in current demand, then voltage selector 203 may distribute the voltage signal from voltage generator 201a. However, if system monitor 202 is asserting a signal to indicate an impending change in current demand, then voltage selector 203 may distribute the voltage signal from voltage generator 201b.

It is noted that the embodiment of a power management unit 200 as illustrated in FIG. 2 is merely an example. The numbers and types of functional blocks may differ in various embodiments. For instance, more than two supply voltage blocks may be used. In other embodiments, more than one system monitor may be used, with each system monitor configured to detect a different indication of an impending change in current demand.

Figure 3:
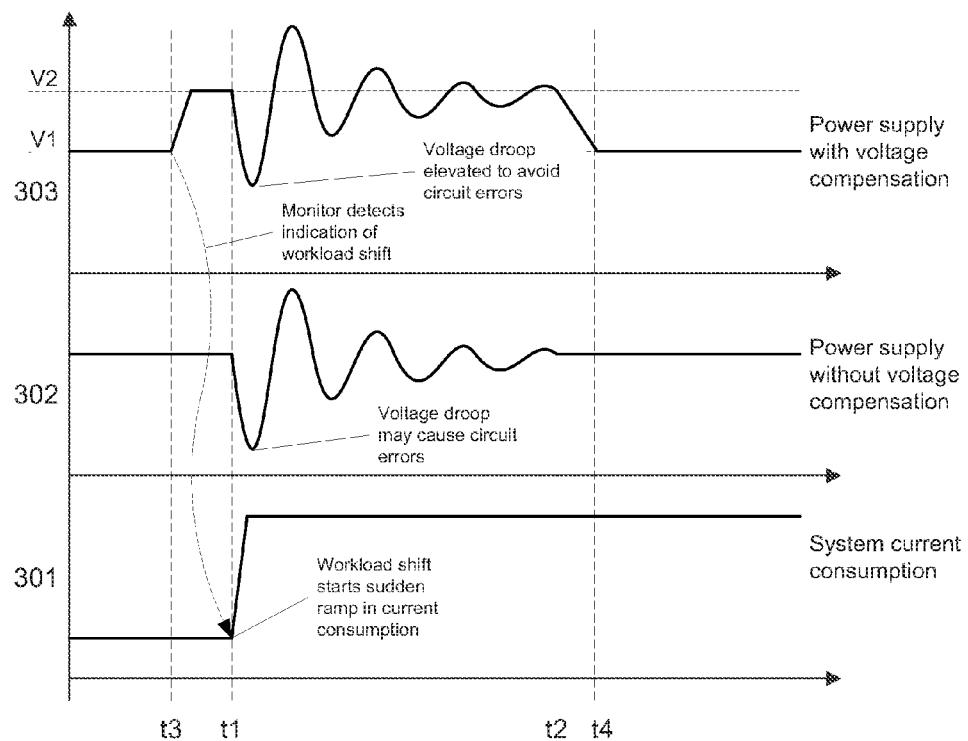
FIG. 3 illustrates possible waveforms of an embodiment of a power management unit.

Turning to FIG. 3, example waveforms that may illustrate the operation of a power management unit, such as, e.g., power management unit 200 as illustrated in FIG. 2, are shown. Referring collectively to the waveforms of FIG. 3 and the embodiment of FIG. 2, waveform 301 may show system current demand versus time. Waveform 302 may show the voltage output signal of a system power supply with no compensation for sudden changes in current demand. Waveform 303 may show the voltage output signal of a system power supply with compensation for sudden changes in current demand.

In this example, time t1 may be when a sudden change in current demand begins, as illustrated in waveform 301. As a result of the sudden change, the voltage level of an output signal from a power supply with no compensation may drop to a voltage level that may be too low for circuits coupled to it. Due to this voltage drop, the coupled circuits may enter an unknown state which could lead to erratic and/or indeterminate behavior, causing a system failure. The event that caused the sudden current demand change may have passed and the output signal of the power supply may have stabilized by a time t2. However, by time t2, the circuits coupled to the power supply output may have already failed.

In contrast, a power supply with compensation for sudden current demand changes, such as for example, power management unit 200 in FIG. 3, may be able to detect when the sudden change in current demand is about to happen. System monitor 202 may receive an indication of the sudden current demand change at time t3. In response to the indication, voltage selector 203 may switch the output signal from V1, supplied by voltage generator 201a, to a higher voltage, V2, supplied by voltage generator 201b. As a result, at time t1 when the sudden current demand change occurs, the output of power management unit 200 may be at voltage level V2 and the voltage drop that may occur in response to the current demand change may only drop to a level near or slightly below V1, the original nominal operating voltage. This voltage drop may remain above the minimum voltage level to keep coupled circuits from entering unknown states and therefore prevent a system failure.

At time t2, when the event that has caused the sudden current demand change has passed and the voltage level of the power management unit 200 output signal has stabilized, voltage selector 203 may switch back to voltage generator 201a. By time t4, the output signal from power management unit 200 may settle back to voltage level V1.

It is noted that FIG. 3 is merely an example of possible waveforms illustrated for demonstration purposes. Actual waveforms may vary due to specific circuit embodiments, technology used to create the circuits and other factors in the operation of the system.

Figure 4:
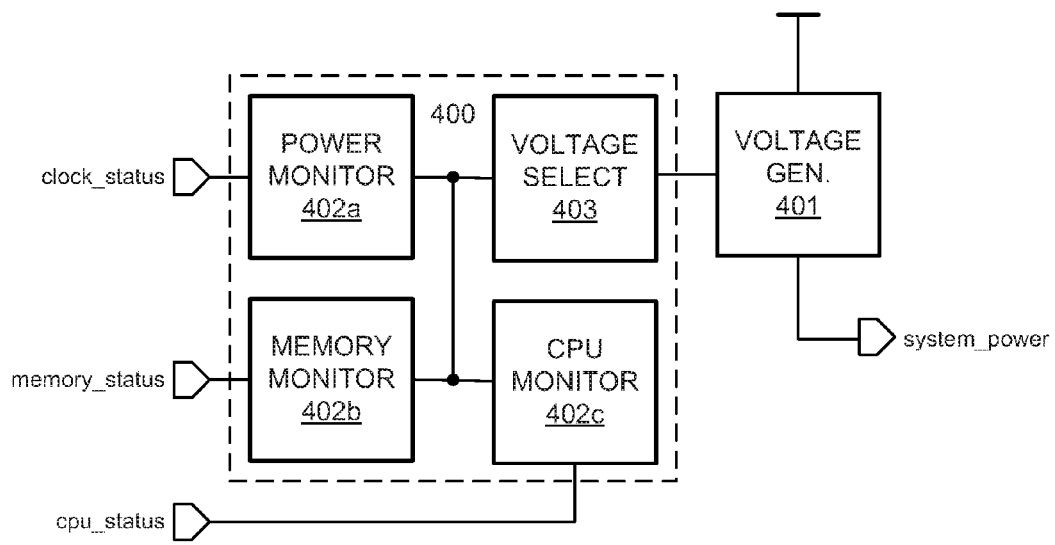
FIG. 4 illustrates an embodiment of a power management unit.

Turning to FIG. 4, an alternate embodiment of a power management unit is illustrated. Power management unit 400, which may correspond to power management unit 108 in FIG. 1, may be coupled to supply voltage 401 and may include multiple monitors 402a-402c and voltage selector 403, coupled to the multiple monitors 402a-402c. Power management unit 400 may receive several status signals from various functional blocks within SoC 100 and use these signals to adjust supply voltage 401.

In some embodiments, supply voltage 401 may vary a voltage level of an output signal, based on a received input signal or signals. During normal operation of SoC 100, supply voltage 401 may output a voltage signal at a nominal operating level. Supply voltage 401 may be part of SoC 100 and coupled to a main voltage supply on SoC 100. In various embodiments, supply voltage 401 may be on a different die or in a different package within a same system as SoC 100. In some embodiments, the output voltage level of supply voltage 401 may correspond to an analog input from power management unit 400 and therefore may be infinitely adjustable between a minimum and maximum output level based on the analog input. In other embodiments, the output voltage level of supply voltage 401 may correspond to a digital input from power management unit 400 and therefore have a finite number of output levels determined by the number of bits of the digital input.

The monitors 402a-402c may include various system monitors used to monitor various aspects of the operation of SoC 100 which may indicate an impending change to the current demand of SoC 100. In some embodiments, system monitors may include power state monitor 402a, memory monitor 402b and CPU monitor 402c.

Power state monitor 402a may detect a transition in a functional block from an off or disabled state to a fully functional state that may result in a rapid change in current demand in SoC 100. In some embodiments, multiple functional blocks may be monitored. In some multi-core CPU embodiments, a count of active cores may be monitored. Monitored functional blocks may include, without limitation, communications interfaces in I/O block 104 from FIG. 1 and circuits in analog/mixed-signal block 105. In some embodiments, power state monitor 402a may monitor commands sent to a functional block and detect when a command will result in a transition from a disabled state to an enabled state. In alternate embodiments, power state monitor 402a may monitor a status signal or register status bit within the functional block to detect an upcoming power state transition.

Memory monitor 402b may detect a read and/or write command to a memory block such as, e.g., memory 103 in FIG. 1. Some memory types may require a high current to read or write a location. For example, flash memories may need a temporary high current when programming data storage cells and Magnetoresistive Random-Access Memory (MRAM) may require temporary high current when reading or writing bit cells. In examples where a temporary high current is required, the current demand grows with every bit cell being read or written. Therefore, a memory access in which many bits cells are being accessed in parallel may create a sudden current demand change. Memory monitor 402b may detect commands sent to memory 103 to determine if an access will result in a sudden current change. In other embodiments, memory monitor 402b may receive a signal from memory 103 if a high current access is about to occur.

CPU monitor 402c may monitor instructions going to a processor, such as, e.g., processor 101 in FIG. 1. In some embodiments, some CPU instructions and/or sequences of instructions may create a sudden change in current demand by activating additional logic associated with processor 101. For example, a subset of instructions that may be executed by processor 101 may activate a math co-processor or a graphics co-processor, thereby resulting in an increase in current. CPU monitor 402c may monitor an instruction pipeline in processor 101 to detect instructions known to impact current consumption. In other embodiments, an instruction queue or cache memory inside processor 101, such as, for example, core memory 102, may send a signal to CPU monitor 402c if instructions known to cause current surges are detected.

Additional types of monitors may be included in power management unit 400, such as, for example, a clock monitor (not shown). A clock monitor may detect a change in clock settings that will result in a sudden change in a system clock which may consequently result in a rapid change in current demand in SoC 100. In some embodiments, a single clock signal may go to many functional blocks throughout SoC 100. A change in the frequency of a clock output in such an embodiment may cause a shift in current consumption as all clocked functional blocks shift to the higher frequency in parallel. In some embodiments, the clock monitor may monitor commands sent to clock management unit 106, from FIG. 1, and detect when a command will result in a change to the frequency of the system clock. In alternate embodiments, the clock monitor may receive a signal from clock management unit 106 indicating that clock management unit 106 is about to change the output frequency.

Voltage selector 403 may receive inputs from monitors 402a-402c that indicate an impending sudden current change. Dependent upon received inputs, voltage selector may send a signal to supply voltage 401 to select a given voltage level for the output signal. In some embodiments, voltage selector 403 may select between two voltage levels, such as, e.g., a nominal operating voltage and a high-current voltage level. In other embodiments, voltage selector 403 may select from various voltage levels based on which monitor sent the signal indicating an impending sudden current change. In further embodiments, monitors 402a-402c may send additional data to indicate the severity of the impending sudden current change and voltage selector 403 may select a voltage level based on this additional data.

Voltage selector 403 may send a signal to return supply voltage to a nominal operating voltage in response to determining the sudden current change has occurred. In various embodiments, voltage selector 403 may wait a pre-determined amount of time between signaling for a voltage change and signaling for a return to the normal operating voltage. In other embodiments, voltage selector 403 may wait for a signal from the monitor 402a-402c that initiated the voltage change that it is safe to return to the normal operating voltage. In further embodiments, voltage selector 403 may use a different pre-determine amount of time for each type of monitor. In some embodiments, the voltage level of the output signal from supply voltage 401 may be monitored and voltage selector 403 may signal a return to the normal operating voltage once the output signal has stabilized.

In some embodiments Monitors 402a-402c may communicate to voltage selector 403 through a shared bus. In other embodiments, monitors 402a-402c may communicate through a dedicated signal for each monitor. In some embodiments, monitors 402a-402b may each be an independent circuit or in other embodiments, some or all of monitors 402a-402b may share a portion of their respective circuitry.

The embodiment of FIG. 4 is merely an example embodiment of a power management unit. In various embodiments, other types of system monitors may be included and any number of monitors may be included. In some embodiments, more than one supply voltage 401 may be controlled by power management unit 400. In various embodiments, supply voltage 401 may be included as part of power management 400 or coupled to power management unit 400 as a separate circuit. In various embodiments, supply voltage 401 may provide a voltage equal to or lower than a main SoC 100 power supply voltage level or supply voltage 401 may provide a voltage signal higher or lower than the main SoC 100 power supply voltage level.

Methods for Managing Power Supply Voltage Level

Figure 5:
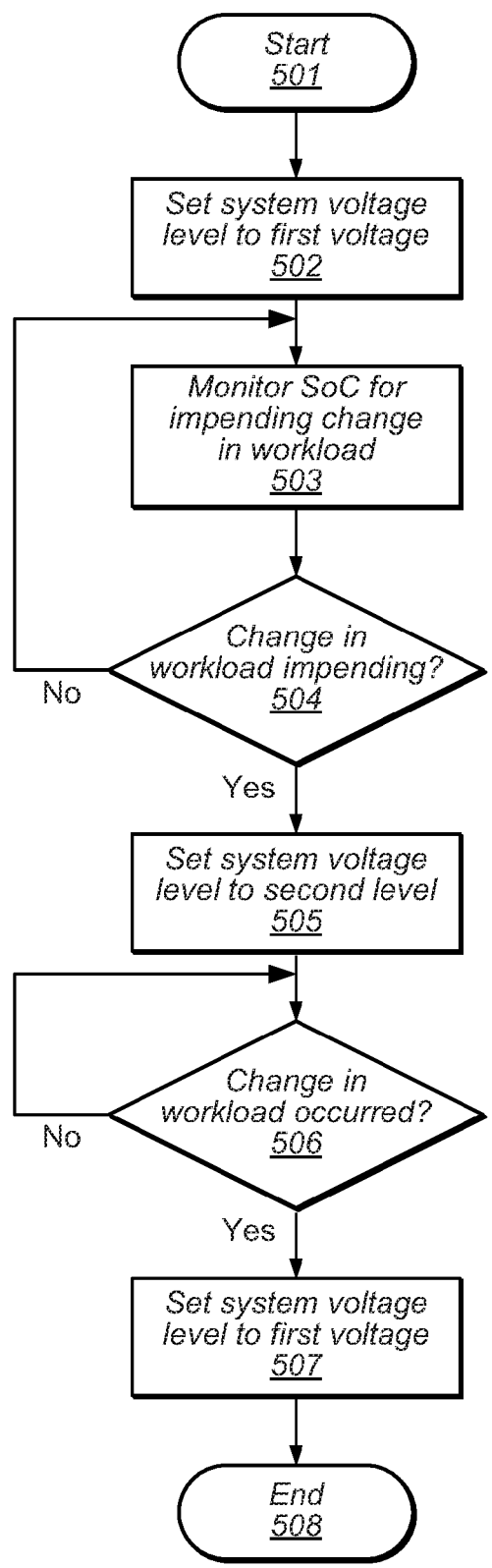
FIG. 5 illustrates a flowchart of an embodiment of a method for setting the voltage regulator drive output.

Turning to FIG. 5, a method is illustrated for controlling a power management unit, such as, e.g., power management unit 200 in FIG. 2. Referring collectively to SoC 100, power management unit 200, and the flowchart in FIG. 5, the method may begin in block 501. Power management unit 200 may set a system power supply output voltage to a first operating voltage level (block 502). In some embodiments, the first voltage may correspond to an output of voltage generator 201a.

The method may include monitoring SoC 100, through system monitor 202, to detect indications of an impending change in workload which may suddenly increase the current draw (block 503). It is noted that many indications of a sudden change in workload may be monitored, such as, for example, a change to the frequency of a main clock source, execution of certain processor instructions, access to some memory types, enabling or disabling of various functional modules, and more.

The method may then determine if an impending change is about to occur (block 504). The determination may be made by observing commands sent to a monitored functional block to determine of a specific command or sequence of commands is sent to the monitored functional block. In alternate embodiments, the monitored functional block may send a signal to system monitor 202. If no impending change in workload is detected, the method may move back to block 503 and continue monitor the SoC. If an impending change in workload is detected, the method may move to block 505.

In response to an indication of an impending change in workload, the method may then change the system power supply output voltage to a second voltage level (block 505). In some embodiments, the change to a second voltage level may include voltage selector 203 switching from the output of voltage generator 201a with a first voltage level to the output of voltage generator 201b with a second voltage level. In other embodiments, switching to a second voltage level may include sending a command to adjust the output voltage level to a variable voltage supply, such as, e.g., supply voltage 401 in FIG. 4.

After the voltage level has been changed, the method may determine if the change in workload has occurred (block 506). In some embodiments, this determination may include waiting for a predetermined amount of time. In other embodiments, the determination may include receiving a signal from system monitor 202 that the change in workload has occurred. In further embodiments, the determination may include waiting a predetermined amount of time after receiving a signal from system monitor 202 that the change in workload has occurred. If the change in workload has not occurred, the method may remain in block 506. If the change in workload has been determined to have occurred, the method may move to block 507.

Once the change in workload has occurred, the method may change the power supply output voltage back to the first voltage level (block 507). In some embodiments, the change back to a first voltage level may include voltage selector 203 switching from the output of voltage generator 201b to the output of voltage generator 201a. In other embodiments, switching to a second voltage level may include sending a command to adjust the output voltage level to a variable voltage supply, such as, e.g., supply voltage 401 in FIG. 4. In further embodiments, the method may change the output voltage to a third voltage level. The method may end in block 508.

It is noted that the method illustrated in FIG. 5 is merely an example embodiment. Variations on this method are possible, such as, for example, although the method in FIG. 5 illustrates operations occurring in series, some or all of the operations may be performed in parallel or in a different sequence. In some embodiments, additional operations may be included.

Figure 6:
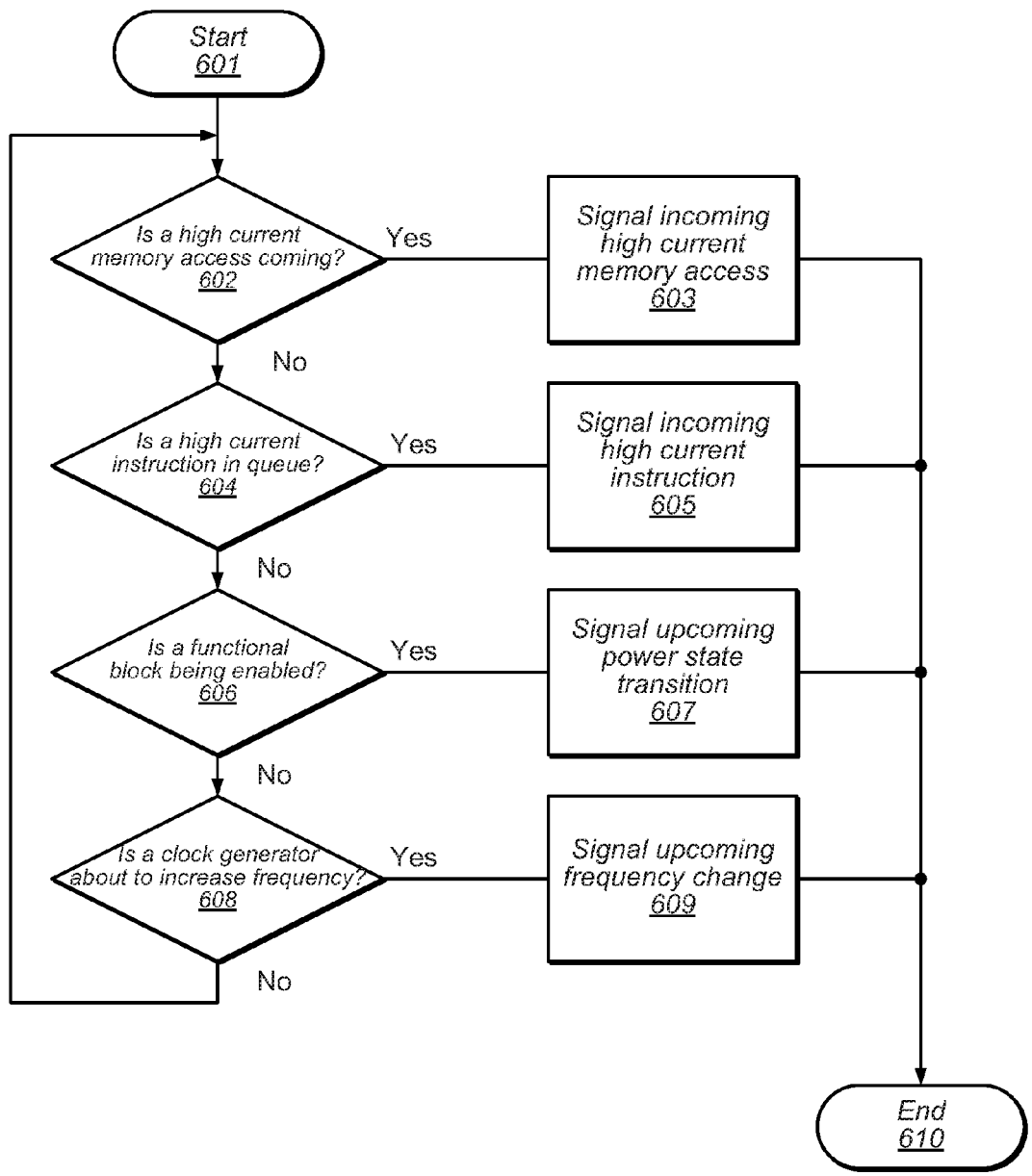
FIG. 6 illustrates a flowchart of an embodiment of a method for monitoring

Turning to FIG. 6, a method is illustrated for monitoring an SoC to identify an impending change in workload. FIG. 6 may in some embodiments, correspond to block 503 in FIG. 5. Referring collectively to SoC 100, power management unit 400 in FIG. 4, and the flowchart in FIG. 6, the method may begin in block 601.

The method may monitor a memory, such as, e.g., memory 103 in FIG. 1 (block 602). Memory 103, in some embodiments, may be a non-volatile memory that requires a high current to read and/or write. Monitoring logic, such as, e.g., memory monitor 402b in FIG. 4, may, in some embodiments, monitor an address bus coupled to memory 103 and detect when an address presented on the bus matches an address location within memory 103. In alternate embodiments, memory monitor 402b may monitor a read/write signal coupled to memory 103 to detect if a read signal and/or write signal is asserted, which may indicate an impending high current memory access. If no indications of a high current memory access are detected, the method may move to block 604. Otherwise, if an indication is detected, the method may move to block 603.

In block 603, in certain embodiments, memory monitor 402b may detect an indication of an impending high current memory access. In response to the indication, memory monitor 402b may assert a signal to voltage selection logic, such as voltage selector 403 in FIG. 4. In some embodiments, memory monitor 402b may send a delay time associated with the impending high current memory access to indicate how long the high current demand may last. Once the signal has been asserted, the method may end in block 610.

In block 604, the method may monitor instructions about to be executed by one or more processors, such as, e.g., processor 101 in FIG. 1. Certain instructions may result in a high current spike, for example, instructions that require use of a co-processor such as for example, a floating point unit or an encryption acceleration unit. In some embodiments, CPU monitoring logic, such as, e.g., CPU monitor 402c in FIG. 4, may monitor instructions as they are read from a memory. In other embodiments, the instructions may be monitored within an instruction queue, an instruction cache, or instruction pipeline within a processor complex. If no high current instruction is observed by CPU monitor 402c, the method may move to block 606. If a high current instruction is observed, the method may move to block 605.

In block 605, in certain embodiments, CPU monitor 402c may detect an indication of a high current instruction soon to be executed by processor 101. In response to the indication, CPU monitor 402c may assert a signal to voltage selector 403. In some embodiments, CPU monitor 402c may send a delay time associated with the impending high current instruction execution to indicate how long the high current demand may last. Once the signal has been asserted, the method may end in block 610.

Various functional blocks throughout SoC 100 may be monitored by power state monitoring logic, such as, e.g., power state monitor 402a in FIG. 4. Power state monitor 402a may detect indications of a transition from an off or low power state to a fully functional state (block 606). Examples of functional blocks that may be monitored in various embodiments include, but are not limited to, additional processors, communications interfaces (Ethernet, Universal Serial Bus, Mobile Industry Processor Interface, Peripheral Component Interconnect Express), audio codecs, video codecs, and analog circuits (analog-to-digital converters, digital-to-analog converters, phase-locked loops, delay-locked loops). Various methods for monitoring power state transitions of one or more functional blocks may include detecting enable signals coupled to the functional blocks, monitoring an address and data bus for commands to enable the functional blocks, and monitoring status signals or register bits corresponding to the power states of the functional blocks. If no power state transition is observed, the method may move to block 608. If a power state transition is observed, the method may move to block 607.

In block 607, an indication of an upcoming power state transition may be detected. In response to the indication, power state monitor 402a may assert a signal to voltage selector 403. In some embodiments, a delay time associated with the impending power state transition may be sent to indicate how long the high current demand may last. Once the signal has been asserted, the method may end in block 610.

In block 608, clock monitoring logic may detect indications of an upcoming change to a frequency of a clock signal. An increase in a clock signal frequency may result in the functional blocks utilizing that clock signal to create an increase in current demand. Clock monitoring logic may observe commands sent to a clock generation circuit, such as, e.g., clock management unit 106 and detect when a command will result in a change to the frequency of a clock signal. In alternate embodiments, the clock monitoring logic may receive a signal from clock management unit 106 indicating that clock management unit 106 is about to change the output frequency. If no clock signal frequency transition is observed, the method may move back to block 602. If a clock signal frequency transition is observed, the method may move to block 609.

In block 609, an indication of a clock signal frequency transition may be detected. In response to the indication, clock monitoring logic may assert a signal to voltage selector 403. In some embodiments, a delay time associated with the impending clock signal frequency transition may be sent to indicate how long the high current demand may last. Once the signal has been asserted, the method may end in block 610.

It is noted that the method illustrated in FIG. 6 is merely an example embodiment. Variations on this method are possible, such as, for example, although the method in FIG. 6 illustrates operations occurring in series, some or all of the operations may be performed in parallel or in a different sequence. In some embodiments, additional operations may be included.

Numerous variations and modifications will become apparent to those skilled in the art once the above disclosure is fully appreciated. It is intended that the following claims be interpreted to embrace all such variations and modifications.

What is claimed is:

1. A mobile computing device, comprising:
one or more processors;
one or more functional blocks;
a power supply unit configured to generate a plurality of voltage levels at an output of the power supply unit; and
a power management unit configured to:
set the output of the power supply unit to a nominal voltage level;
adjust the output of the power supply unit to a new voltage level in response to a detection of an indication of an impending change in current demand in the mobile computing device;
detect that the impending change in current demand has occurred in response to a determination that the voltage level of the output of the power supply unit has stabilized at the new voltage level; and
adjust the output of the power supply unit back to the nominal voltage level in response to detecting that the impending change in current demand has occurred.

2. The mobile computing device of claim 1, wherein to detect the indications of the impending change in current demand within the mobile computing device, the power management unit is further configured to monitor an instruction pipeline in at least one processor of the one or more processors.

3. The mobile computing device of claim 1, wherein at least one of the one or more functional blocks includes a memory coupled to the one or more processors, and wherein to detect the indications of the impending change in current demand within the mobile computing device, the power management unit is further configured to monitor a read/write signal sent to the memory.

4. The mobile computing device of claim 1, wherein at least one of the one or more functional blocks includes a clock generation circuit configured to output a clock signal, and wherein to detect the indications of the impending change in current demand within the mobile computing device, the power management unit is further configured to monitor the clock generation circuit for indications of an upcoming change in frequency of the clock signal.

5. The mobile computing device of claim 1, wherein to detect the indications of the impending change in current demand within the mobile computing device, the power management unit is further configured to monitor a power status of the one or more functional blocks.

6. The mobile computing device of claim 1, wherein the power management unit is further configured to wait a pre-determined amount of time after detecting the impending change in current demand has occurred, wherein the pre-determined amount of time depends upon a source of a cause for the impending change in current demand.

7. The mobile computing device of claim 1, wherein to adjust the output of the power supply unit back to the nominal voltage level, the power management unit is further configured to wait until the indication of the impending change in current demand ceases to indicate the impending change in current demand.

8. A mobile computing device, comprising:
 one or more memories configured to store instructions; and
 one or more processors configured to receive instructions from the one or more memories and execute the instructions to cause the mobile computing device to perform operations including:

setting an output of a power supply to a nominal voltage level;
 detecting at least one indication of an impending change in workload in the mobile computing device;
 selecting a new voltage level from a plurality of voltage levels based on data indicative a magnitude of the impending change in workload;
 setting the output of the power supply to the new voltage level; and
 adjusting the output of the power supply back to the nominal voltage level in response to detecting that the impending change in workload has occurred.

9. The mobile computing device of claim 8, wherein the at least one indication corresponds to an instruction in an instruction pipeline of a particular processor of the one or more processors.

10. The mobile computing device of claim 8, wherein the at least one indication corresponds to a particular instruction stored in an instruction cache memory associated with a particular processor of the one or more processors.

11. The mobile computing device of claim 8, wherein the at least one indication corresponds to a change in a setting of a clock source that provides a clock signal to at least one of the one or more processors.

12. The mobile computing device of claim 8, wherein the at least one indication corresponds to a number of the one or more processors that are currently active.

13. The mobile computing device of claim 8, wherein the at least one indication corresponds to an enabling of a communication interface coupled to the output of the power supply.

* * * * *